US009602563B2

(12) United States Patent
Barkai et al.

(10) Patent No.: US 9,602,563 B2
(45) Date of Patent: Mar. 21, 2017

(54) SELECTIVE CONTENT DELIVERY IN A REAL-TIME STREAMING ENVIRONMENT

(71) Applicant: International Business Machines Corporation, Armonk, NY (US)

(72) Inventors: Gilad Barkai, Haifa (IL); David Carmel, Haifa (IL); Ido Guy, Haifa (IL); Gilad Kutiel, Haifa (IL); Tal Steier, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 13/864,274

(22) Filed: Apr. 17, 2013

(65) Prior Publication Data

US 2014/0317237 A1    Oct. 23, 2014

(51) Int. Cl.
| | |
|---|---|
| *G06F 15/16* | (2006.01) |
| *H04L 29/06* | (2006.01) |
| *G06F 17/30* | (2006.01) |
| *G06Q 10/10* | (2012.01) |
| *H04N 21/258* | (2011.01) |

(Continued)

(52) U.S. Cl.
CPC .... *H04L 65/4084* (2013.01); *G06F 17/30867* (2013.01); *G06Q 10/10* (2013.01); *H04N 21/25891* (2013.01); *H04N 21/4532* (2013.01); *H04N 21/4668* (2013.01); *G06Q 50/01* (2013.01)

(58) Field of Classification Search
CPC .......... H04L 65/4084; G06F 17/30867; H04N 21/4668; H04N 21/25891; H04N 21/4532; G06Q 10/10; G06Q 50/01
See application file for complete search history.

(56) References Cited

U.S. PATENT DOCUMENTS

| | | | | |
|---|---|---|---|---|
| 2007/0039023 A1* | 2/2007 | Kataoka | ............. | H04N 5/44543 |
| | | | | 725/46 |
| 2007/0214477 A1* | 9/2007 | Read | .................. | H04N 21/2381 |
| | | | | 725/38 |

(Continued)

OTHER PUBLICATIONS

Kresimir Pripuzic, "Top-K Publish/Subscribe Matching Model Based on Sliding Window", Doctoral Thesis from the University of Zagreb, Faculty of Electrical Engineering and Computing, Zagreb, 2010.

*Primary Examiner* — Oanh Duong
(74) *Attorney, Agent, or Firm* — Gilbert Harmon, Jr.

(57) ABSTRACT

Machines, systems and methods for dynamic content filtering are provided. The method comprises receiving an indication for a preference for an approximate number of content to be delivered during an indicated time period; assigning a first score to the first content according to one or more factors, in response to receiving a first content at a first point in time during the first time period; delivering the first content, in response to determining that the first score is above a first dynamically calculated threshold, wherein the first dynamically calculated threshold is calculated based on:

t: time of arrival of the first content,
k(t): number of contents that has been delivered until the first point in time,
K: the approximate number of events to be delivered during the indicated time period, and
F: a distribution function calculated based on prior history of the content delivered.

20 Claims, 4 Drawing Sheets

(51) Int. Cl.
*H04N 21/45* (2011.01)
*H04N 21/466* (2011.01)
*G06Q 50/00* (2012.01)

(56) References Cited

U.S. PATENT DOCUMENTS

| | | | |
|---|---|---|---|
| 2007/0282797 A1* | 12/2007 | Wang | G06F 17/30867 707/999.003 |
| 2008/0126476 A1* | 5/2008 | Nicholas | G06Q 10/10 709/203 |
| 2012/0005203 A1* | 1/2012 | Brzozowski | G06F 17/30867 707/732 |
| 2013/0024511 A1* | 1/2013 | Dunn | G06Q 50/01 709/204 |
| 2013/0238706 A1* | 9/2013 | Desai | H04L 67/306 709/204 |
| 2014/0101149 A1* | 4/2014 | Winters | G06F 17/30345 707/736 |
| 2014/0136521 A1* | 5/2014 | Pappas | G06Q 50/01 707/722 |
| 2014/0195930 A1* | 7/2014 | Rajagopal | G06F 3/0484 715/753 |

\* cited by examiner

SELECTIVE CONTENT DELIVERY IN A REAL-TIME STREAMING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to dynamically selecting a certain number of events or content for delivery, during a designated time period for real-time streaming.

BACKGROUND

Many platforms (e.g., Facebook, Twitter, LinkedIn, etc.) deliver content to a user according to a user's subscription or preference. Managing the stream of contents and events generated by such platforms may become overwhelming, as the content streams become dense and the delivery events become so frequent that the user has a difficult time selecting or reviewing the more pertinent content. It would be desirable to allow the user control the throughput of the content stream by limiting the number of daily events in the feed received by the user, as well as a mechanism that is capable of selecting the most interesting or relevant events in the stream for the particular user.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for dynamic content filtering is provided. The method comprises receiving an indication for a preference for an approximate number of content to be delivered during an indicated time period; assigning a first score to the first content according to one or more factors, in response to receiving a first content at a first point in time during the first time period; delivering the first content, in response to determining that the first score is above a first dynamically calculated threshold, wherein the first dynamically calculated threshold is calculated based on:

t: time of arrival of the first content,
k(t): number of contents that has been delivered until the first point in time,
K: the approximate number of events to be delivered during the indicated time period, and
F: a distribution function calculated based on prior history of the content delivered.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
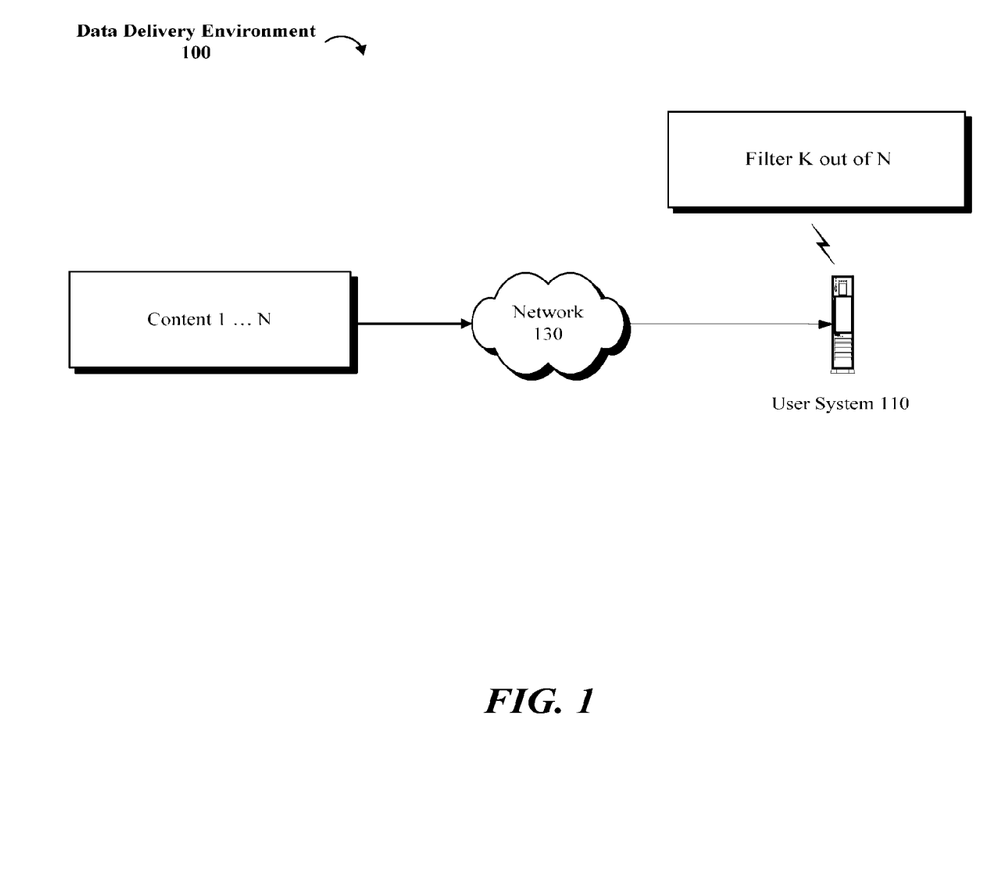
FIG. 1 illustrates an exemplary data delivery environment in accordance with one or more embodiments.

Referring to FIG. 1, a content distribution system (e.g., a data delivery environment 100) is provided, wherein a user is provided with an option to limit the number of content items delivered to the user system 110 during a period of time over network 140. For example, a user may have subscribed to multiple (i.e., N) news feeds but may not have the time to read all the content items delivered through the N news feeds. As such, in one embodiment, he may indicate that he would like to filter the N feeds to at most receive K feeds per day, for example.

Figure 2:
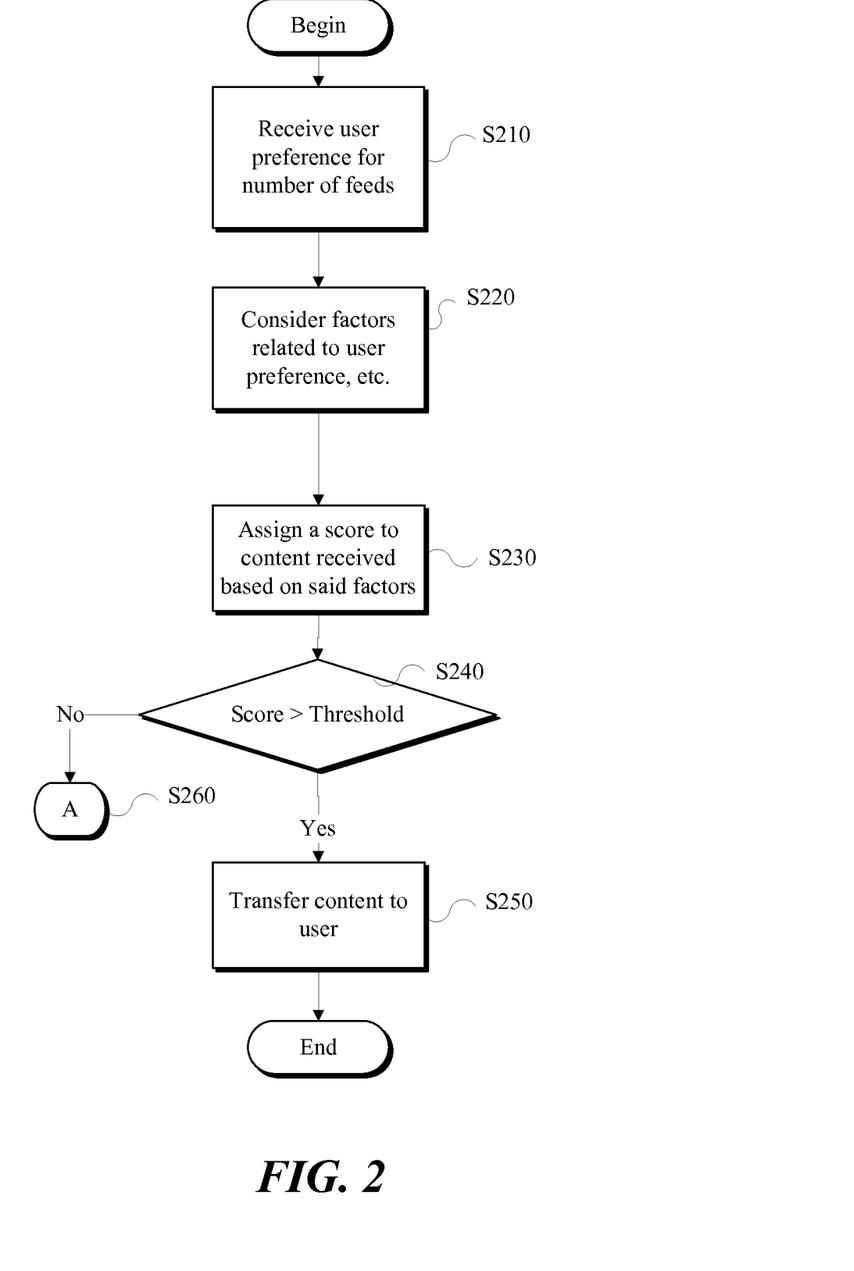
FIG. 2 is a flow diagram of an exemplary method for selective content delivery, in accordance with one embodiment.

Referring to FIG. 2, in one implementation, a user may provide the maximum or the approximate maximum number of desired feeds (e.g., K) per a selected time period (e.g., 24 hours) (S210). One or more factors related to user preference or user profile, as well as factors related to newsworthiness of a content item, may be analyzed as one or more content items are received during the course of the selected time period (S220). Using the factors noted above, a content item may be given a score (S230).

In one implementation, the given score may be then compared with a first threshold value (e.g., θ) (S240). The first threshold value may be calculated dynamically based on a known or estimated distribution value for the number of events received by the user in the past (and also optionally based on the current time and the number of items the user has received previously). If the score is higher than the first threshold value, then the content is delivered to the user (S250). Otherwise, the content is skipped, rejected, archived or other remedial measure is taken (S260).

In one embodiment, if a content item is below the first dynamically calculated threshold but above a second fixed threshold, the content item is marked or placed in a reserve. If during the rest of the time remaining, a newer content item arrives that is below the second fixed threshold but above the dynamically calculated first threshold (where the dynamically calculated threshold is below the second fixed threshold), optionally, the content placed in the reserve is delivered to the user instead of the new content.

In one implementation, the first threshold θ may be calculated as provided below, assuming the following:

a distribution $F_{score}$ of events scores,

N events reach the system per day, the user requested to see K events per day.

For a moment in time t, after k(t) events are displayed to the user, a threshold θ may be calculated such that:

$$\int_{\theta}^{1} F_{score}\, df = K - k(t).$$

Since F, K, k(t) are known, θ may be calculated based on the above formula, where:

t: time of arrival of the event, k(t): No. of events that a user has already seen, K: the maximum number of events to be displayed to the user, F: a known distribution function based on prior history of the events received by the user.

In the following a simplified numerical example for calculating the threshold value θ in accordance with one embodiment is provided. It is noteworthy, however, that in a practical real-world application, it is expected that the scoring function will be continuous and that more events will be displayed than that disclosed in the example below. Therefore, outside this example, the process of updating the threshold may happen more frequently (e.g., after an item has reached the system) and the changes to the threshold may be smaller.

It is also noted that in this example, it is presumed that we know in advance that there will be 100 events during a day, and that after half a day exactly 50 items were already considered. In other scenarios where the number of events is not known in advance, there may be a need to estimate the number of events N during the target time period and to update such estimation. Estimating N, as noted earlier, may be based on calculating the pertinent Gaussian distribution.

In our limited example, assume that an event or item that is delivered may be assigned a score between 0 and 1 and that the scores for the plurality of the items are distributed as follows:

| score | Percentage of items |
| --- | --- |
| 1 | 2% |
| 0.9 | 6% |
| 0.8 | 12% |
| 0-0.7 | %80 |

Also, assume that in this simplified example, it is known that the user receives 100 items a day, and that the user has opted to be notified of the best 8 events or items each day. Then, at the beginning of the day:

N=100 (Number of events that is going to reach the system)

K=8 (Number of items the user asked for)

k(t)=0 (Number of items already presented to the user)

Also assume that that $F_{score}$ is going to give scores to items as follows:

| score | Number of items |
| --- | --- |
| 1 | 2 |
| 0.9 | 6 |
| 0.8 | 12 |
| 0-0.7 | 80 |

Accordingly, threshold θ is set such that:

$$\int_{\theta}^{1} F_{score}\, df = 8 (K - k(t) = 8)$$

In other words, a score θ is calculated for which there will be 8 events with a score of θ and higher. In the above example, the target score is 0.9 (i.e., since 8 of the events will receive a score of 0.9 and above). Thus, θ may be set to 0.9 in the above example. For the purpose of this example, it is assumed that half of the day has passed, and the system already considered 50 items and presented the user with 7 items out of the 50 (i.e., because 7 items received a score of 0.9 and above).

In the above example, at midday we have:

N=50 (Number of events that is going to reach the system)

K=8 (Number of items the user asked for)

k(t)=7 (Number of items already presented to the user)

Accordingly, $F_{score}$ is going to give scores to the remaining 50 items as follows:

| score | Number of items |
| --- | --- |
| 1 | 1 |
| 0.9 | 3 |
| 0.8 | 6 |
| 0-0.7 | 40 |

In the above example, a threshold θ may be set such that:

$$\int_{\theta}^{1} F_{score}\, df = 1 (K - k(t) = 1)$$

The resulting score is 1 (i.e., because 1 event will get a score of 1 and above), as such θ is set to 1.

In one implementation, K the maximum number of events to be displayed to the user may not be a fixed number and may be calculated according to a range to provide more flexibility in the number of events or content that is delivered to a user, so that more or less than K events may be displayed to the user.

As noted above, in order to display exactly K items to a user, a threshold score θ is calculated such that:

$$\int_\theta^1 F_{score} = K - k(t)$$

In one implementation, if it is desirable to present the user with K±ϵ items, then the calculated value of θ may be increased where:

$$\int_\theta^1 F_{score} = K - k(t) + \epsilon$$

And, the calculated value of θ may be decreased where:

$$\int_\theta^1 F_{score} = K - k(t) - \epsilon$$

Referring back to the simplified example introduced earlier, but in the context of K±ϵ, assume that half a day has past and the user has been already presented with 7 events. In this second example, assume that the user has opted to receive K±ϵ events where ϵ=4. In other words, a user that has designated K=8 to receive 8 events per day, with the K±ϵ option or feature active, the user may receive between 4 to 12 items instead.

In the earlier example, the current threshold was set to 0.9, so it may be determined whether the threshold needs to be updated. According to the above noted formulas:

$$\int_{\theta=0.9}^1 F_{score} = 12$$

This is in the permitted range, and therefore the threshold is not updated.

In a scenario wherein N (i.e., the number of events which reach the system per day) is not known, then the distribution function F may not be determinable. In such a case, it is possible to estimate N using its distribution. For example, assuming that N is a Gaussian distribution with a known parameter λ, and at a moment t in the day n(t) events have reached the system, then value of N may be estimated based on λ,t,n(t) which are all known at the time of calculation, where:

λ: It's a known parameter for the Gaussian Distribution
t: moment in time
n(t): number of events received until t In one implementation, an event's score is calculated to reflect the confidence level that the event will be of interest to the particular user. Such scoring function may be configured to take into account, without limitation, one or more of the factors provided below.

Personalized Factors: A user's profile may include the user's friends and topics of interests. The user profile may be provided by an external application, for example, SaND which constructs a user profile based on the user's activity through social media applications such as blogs, communities, social networking, bookmarking, etc.

Non-Personalized factors: Such factors may include:
Recency—amount of time passed since the event was created
Type—certain types of events are generally more interesting than others (e.g., in a social application the status update of a user's associate is generally more interesting than an event notifying about a wiki edit in which the user may be tagged).
Author popularity—how popular is the author.
Trend score—how trendy is the subject of the event.
Entity popularity—how popular an event is as measured over the entire community of users In one embodiment, the dynamic selection of the top K events in a stream may be solved using an optimal strategy.

On example algorithm that may be considered for the optimal selection of the number of events is the so-called Kleinberg algorithm or Multiple Secretary Hire algorithm, which allows the selection of a certain number of new hires from a pool of candidates without interviewing every single one of the candidates, as disclosed in an article by Robert Kleinberg, entitled "A Multiple-Choice Secretary Algorithm with Applications to Online Auctions."

In Kleinberg, a scenario is illustrated in which an administrator is willing to hire the best secretary out of n rankable applicants for a position. The applicants are interviewed one-by-one in random order. A decision about each particular applicant is to be taken immediately after the interview. Once rejected, an applicant cannot be recalled. During the interview, the administrator can rank the applicant among all applicants interviewed so far, but is unaware of the quality of yet unseen applicants. Kleinberg's solution/algorithm provides the optimal strategy (i.e., a rule when to stop further interviews) in way that maximizes the probability of selecting the best applicant.

The parameters in Kleinberg are the same as those for dynamically selecting top-k events for real-time streaming in that it is desirable to optimally select the number of events to be presented to a user without having to consider all the incoming events. Kleinberg's algorithm may thus be applied to determine when would be the most optimal time to stop showing additional events or items to a user.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3A:
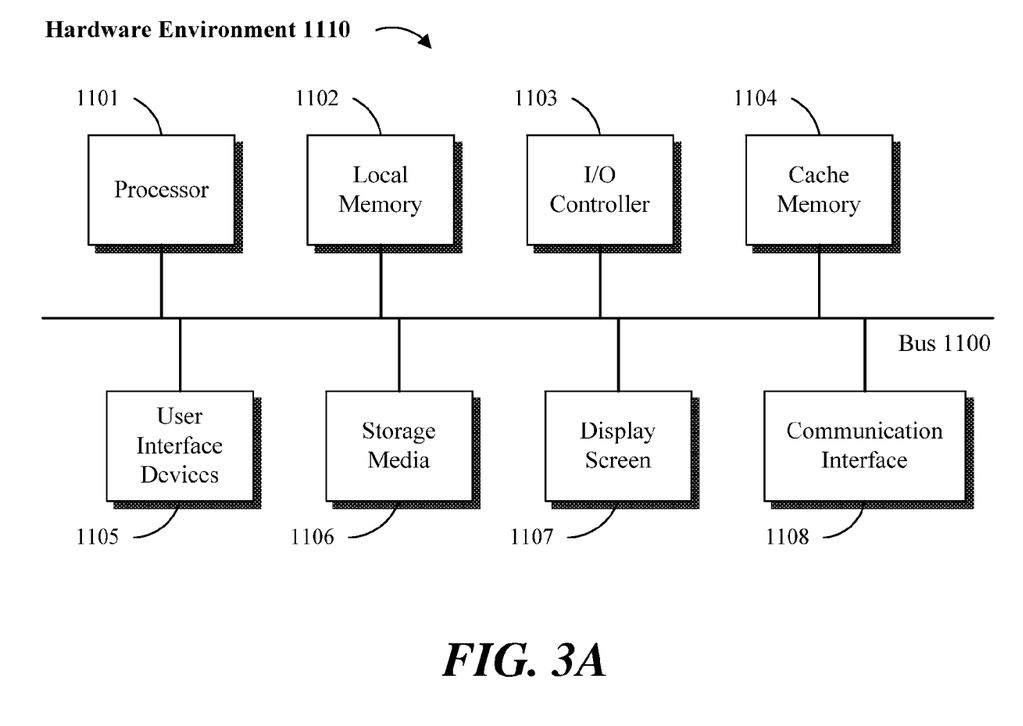
FIGS. 3A and 3B are block diagrams of hardware and software environments in which the disclosed systems and methods may operate, in accordance with one or more embodiments.
Figure 3B:
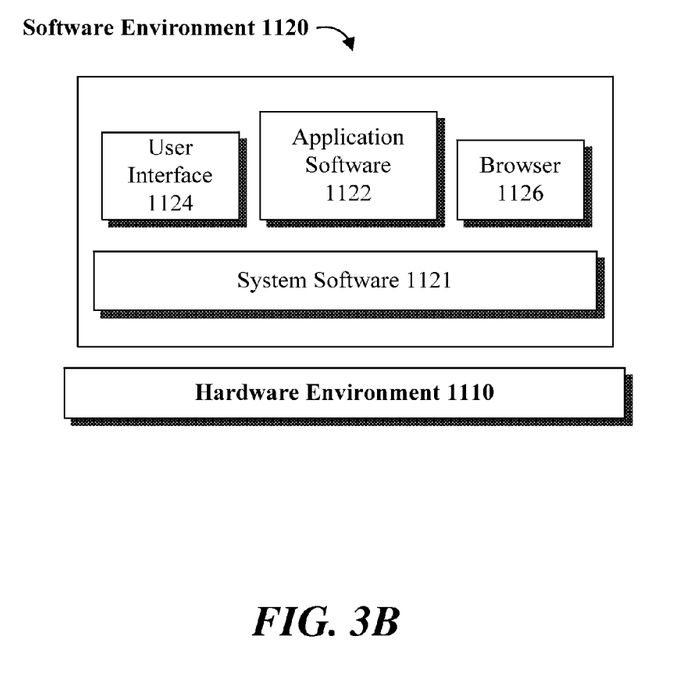

Referring to FIGS. 3A and 3B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 3B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for dynamic content filtering, the computer-implemented method comprising:
   receiving, by a software executed by a computer, an indication for a preference for an approximate number of contents to be delivered during an indicated time period;
   assigning, by the executed software, a first score to a first content according to one or more factors, in response to receiving the first content at a first point in time during the indicated time period;
   delivering, by the executed software, the first content, in response to determining the first score is above a first dynamically calculated threshold,
   wherein the first dynamically calculated threshold is calculated based on:
   t: time of arrival of the first content,
   k(t): number of contents that has been delivered until the first point in time,
   K: the approximate number of contents to be delivered during the indicated time period, and
   F: a distribution function calculated based on prior history of the contents delivered.

2. The method of claim 1, wherein the first dynamically calculated threshold $\theta$ is calculated based on a solution to equation:

$$\int_\theta^1 F_{score}\, df = K - k(t)$$

where: $F_{score}$ is a distribution of scores associated with past contents delivered.

3. The method of claim 1, wherein the one or more factors comprise a user's preference for total number of contents to be delivered during the indicated time period.

4. The method of claim 1, wherein the one or more factors comprise knowledge of a user's interest in the contents.

5. The method of claim 1, wherein the one or more factors comprise age of the contents.

6. The method of claim 1, wherein the one or more factors are related to whether the contents are trending.

7. The method of claim 1, wherein the one or more factors are related to at least one of content's author popularity and content's ranking in a popularity index.

8. The method of claim 1, wherein the first threshold is dynamically calculated at the first point in time using a Kleinberg algorithm.

9. The method of claim 1, wherein a user provides K as the maximum number of contents to be delivered during the indicated time period.

10. The method of claim 9, wherein the user provides K as a soft indication for the maximum number of contents to be delivered during the indicated time period, and a variance K±ϵ is provided to deliver approximately K contents to the user during the indicated time period.

11. A computer system for dynamic content filtering, the computer system comprising:
   one or more computer processors;
   one or more non-transitory computer readable storage media;
   program instructions stored on the one or more non-transitory computer readable storage media for execution by at least one of the one or more computer processors, the program instructions comprising:
      program instructions to receive an indication for a preference for an approximate number of contents to be delivered during an indicated time period;
      program instructions to assign a first score to a first content according to one or more factors, in response to receiving the first content at a first point in time during the indicated time period;
      program instructions to deliver the first content, in response to determining the first score is above a first dynamically calculated threshold,
   wherein the first dynamically calculated threshold is calculated based on:
      t: time of arrival of the first content,
      k(t): number of contents that has been delivered until the first point in time,
      K: the approximate number of contents to be delivered during the indicated time period, and
      F: a distribution function calculated based on prior history of the contents delivered.

12. The computer system of claim 11, wherein the first dynamically calculated threshold θ is calculated based on a solution to equation:

$$\int_\theta^1 F_{score}\, df = K - k(t)$$

where: $F_{score}$ is a distribution of scores associated with past contents delivered.

13. The computer system of claim 11, wherein the one or more factors comprise a user's preference for total number of contents to be delivered during the indicated time period.

14. The computer system of claim 11, wherein the one or more factors comprise knowledge of a user's interest in the first content.

15. The computer system of claim 11, wherein the one or more factors comprise age of the content.

16. A computer program product comprising a non-transitory computer readable storage medium having a computer readable program, wherein the computer readable program when executed on a computer causes the computer to:
   receive an indication for a preference for an approximate number of contents to be delivered during an indicated time period;
   assign a first score to a first content according to one or more factors, in response to receiving the first content at a first point in time during the indicated time period;
   deliver the first content, in response to determining the first score is above a first dynamically calculated threshold,
   wherein the first dynamically calculated threshold is calculated based on:
      t: time of arrival of the first content,
      k(t): number of contents that has been delivered until the first point in time,
      K: the approximate number of contents to be delivered during the indicated time period, and
      F: a distribution function calculated based on prior history of the contents delivered.

17. The computer program product of claim 16, wherein the first dynamically calculated threshold θ is calculated based on a solution to equation:

$$\int_\theta^1 F_{score}\, df = K - k(t)$$

where: $F_{score}$ is a distribution of scores associated with past contents delivered.

18. The computer program product of claim 16, wherein the one or more factors comprise a user's preference for total number of contents to be delivered during the indicated time period.

19. The computer program product of claim 16, wherein the one or more factors comprise knowledge of a user's possible interest in the first content.

20. The computer program product of claim 16, wherein the one or more factors comprise age of the content.

* * * * *